US010606781B2

United States Patent
Tani

(10) Patent No.: US 10,606,781 B2
(45) Date of Patent: Mar. 31, 2020

(54) DATA TRANSMISSION SYSTEM, PROJECTOR, AND DATA TRANSMISSION METHOD INCLUDING FIRST APPARATUS WITH FIRST COMMUNICATION PART AND SECOND APPARATUS WITH SECOND COMMUNICATION PART

(71) Applicant: NEC Display Solutions, Ltd., Tokyo (JP)

(72) Inventor: Tadashi Tani, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 16/080,588

(22) PCT Filed: Mar. 4, 2016

(86) PCT No.: PCT/JP2016/056824
§ 371 (c)(1),
(2) Date: Aug. 28, 2018

(87) PCT Pub. No.: WO2017/149768
PCT Pub. Date: Sep. 8, 2017

(65) Prior Publication Data
US 2019/0065424 A1 Feb. 28, 2019

(51) Int. Cl.
*G06F 13/38* (2006.01)
*G06F 13/40* (2006.01)
(Continued)

(52) U.S. Cl.
CPC .......... *G06F 13/387* (2013.01); *G06F 13/38* (2013.01); *G06F 13/4226* (2013.01); *H04L 69/08* (2013.01); *H04L 69/18* (2013.01)

(58) Field of Classification Search
CPC .................. G06F 13/38; G06F 13/40
See application file for complete search history.

(56) References Cited

U.S. PATENT DOCUMENTS

| 2015/0067203 A1* | 3/2015 | Whitaker | G06F 13/4027 710/63 |
| 2016/0085704 A1* | 3/2016 | Lida | H04N 21/4305 710/106 |
| 2019/0065424 A1* | 2/2019 | Tani | G06F 13/38 |

FOREIGN PATENT DOCUMENTS

| JP | 2011-198047 A | 10/2011 |
| JP | 2015-126324 A | 7/2015 |

OTHER PUBLICATIONS

International Search Report (ISR) (PCT Form PCT/ISA/210), in PCT/JP2016/056824, dated May 24, 2016.

* cited by examiner

*Primary Examiner* — David E Martinez
(74) *Attorney, Agent, or Firm* — McGinn IP Law Group, PLLC.

(57) ABSTRACT

A data transmission system includes a first apparatus that is connected to a first external apparatus using the first transmission scheme and a second apparatus that is connected to a second external apparatus using the first transmission scheme. The first apparatus is connected to the second apparatus using a second transmission scheme that is different from the first transmission scheme. When the operation mode of the first apparatus in the first transmission scheme and the operation mode of the second apparatus in the first transmission scheme are different, data in the first external apparatus or the second external apparatus is transmitted to the second external apparatus or the first external apparatus, respectively, via the first apparatus and the second apparatus.

11 Claims, 11 Drawing Sheets

(51) Int. Cl.
*G06F 13/42* (2006.01)
*H04L 29/06* (2006.01)

[Fig.1]　　　　　　　　　　RELATED ART
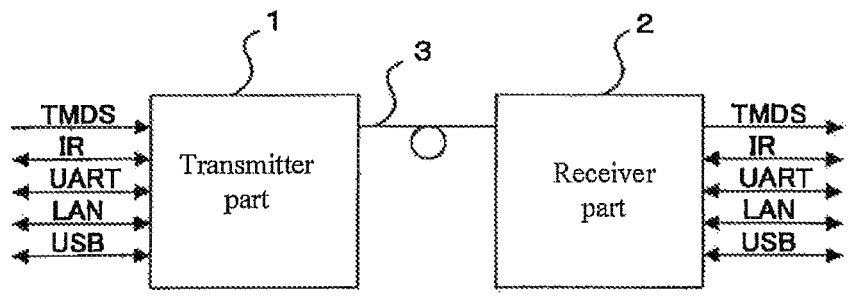
[Fig. 2]　　　　　　　　　　RELATED ART
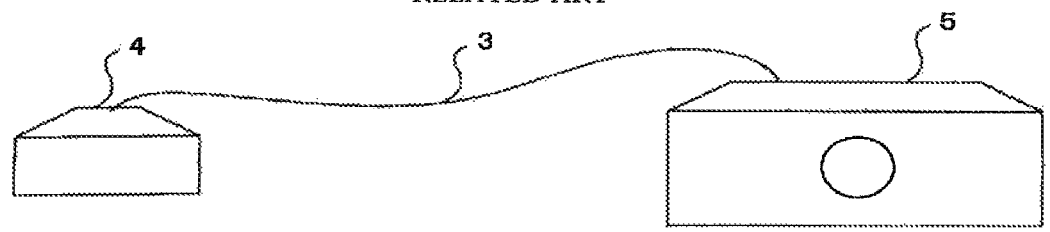

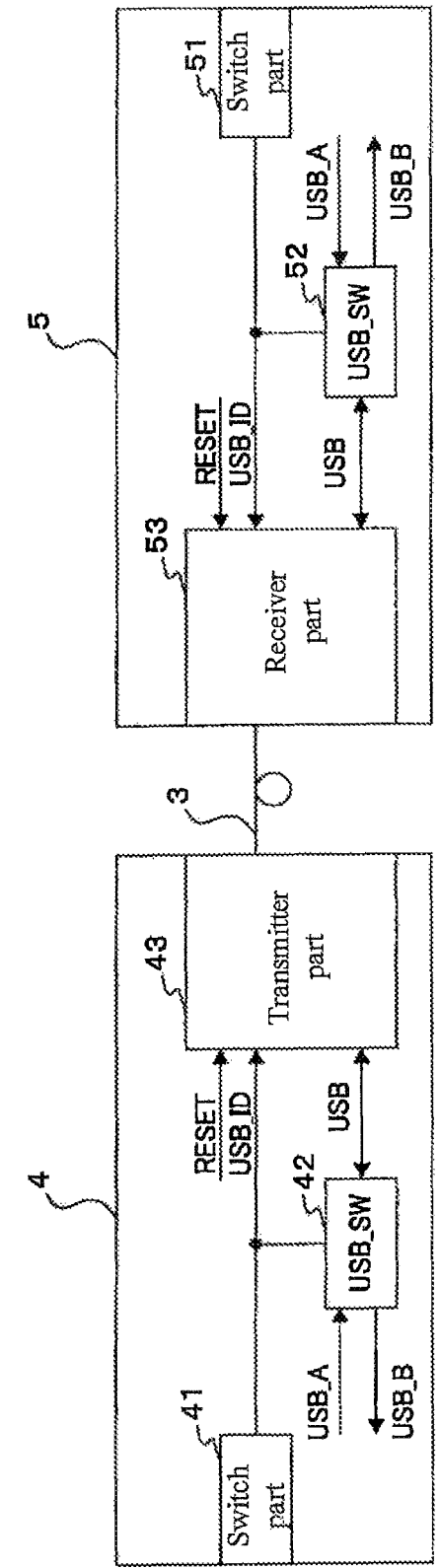
[Fig. 3] RELATED ART

[Fig. 4A]
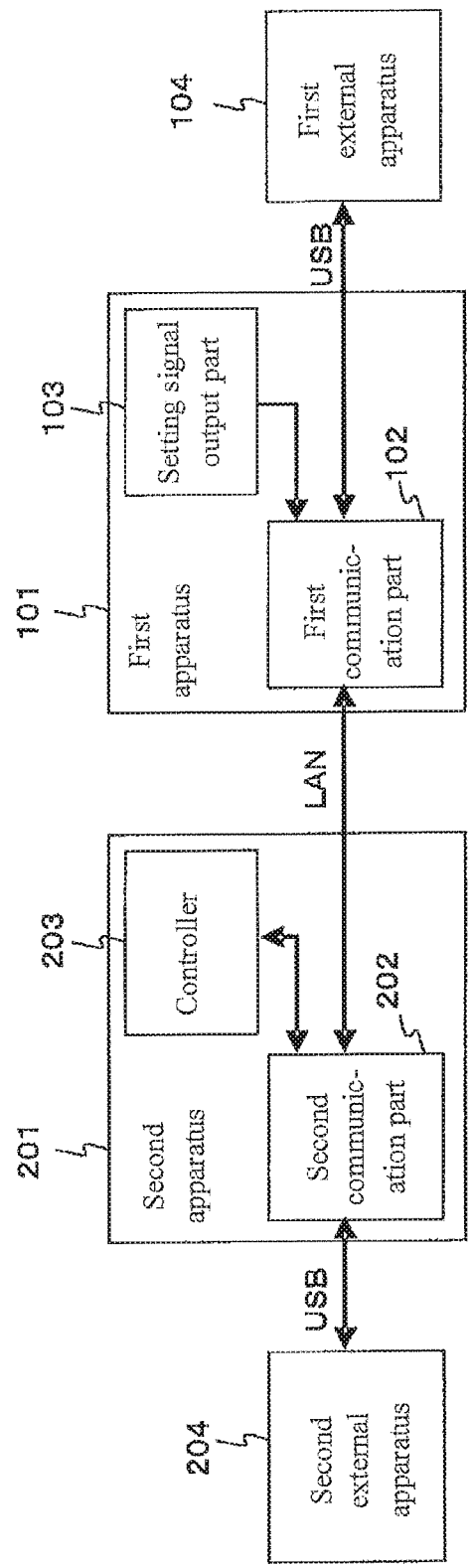

[Fig. 4B]
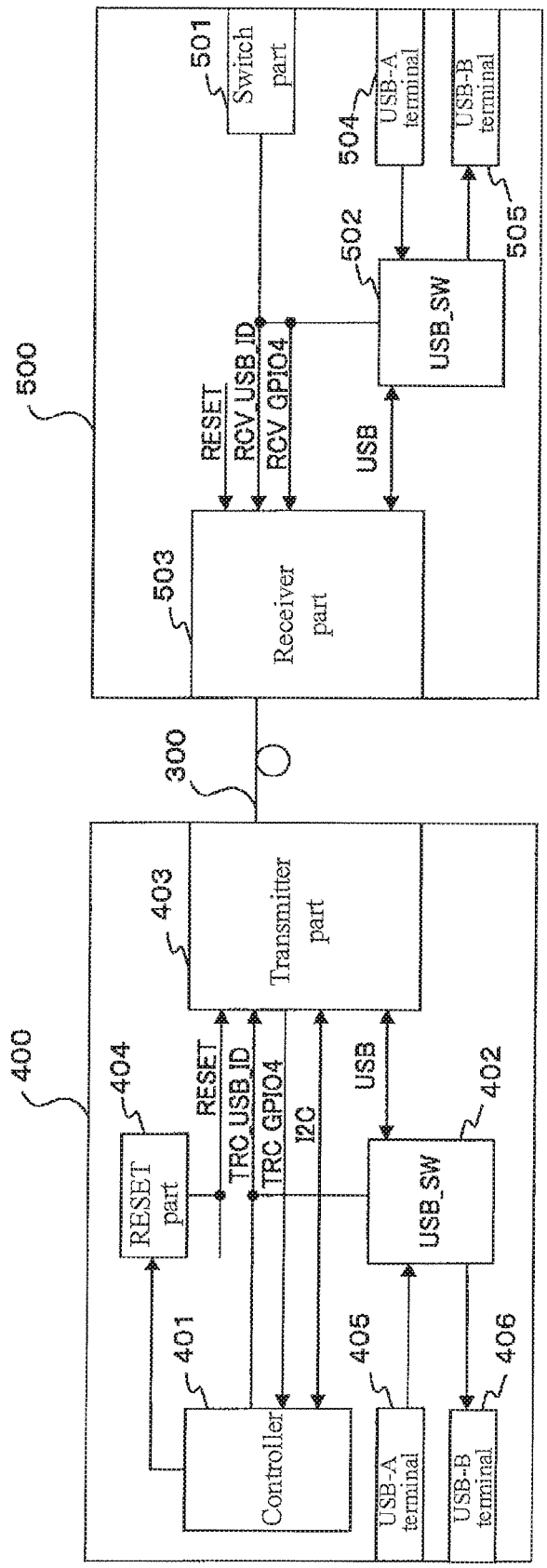

[Fig. 5]
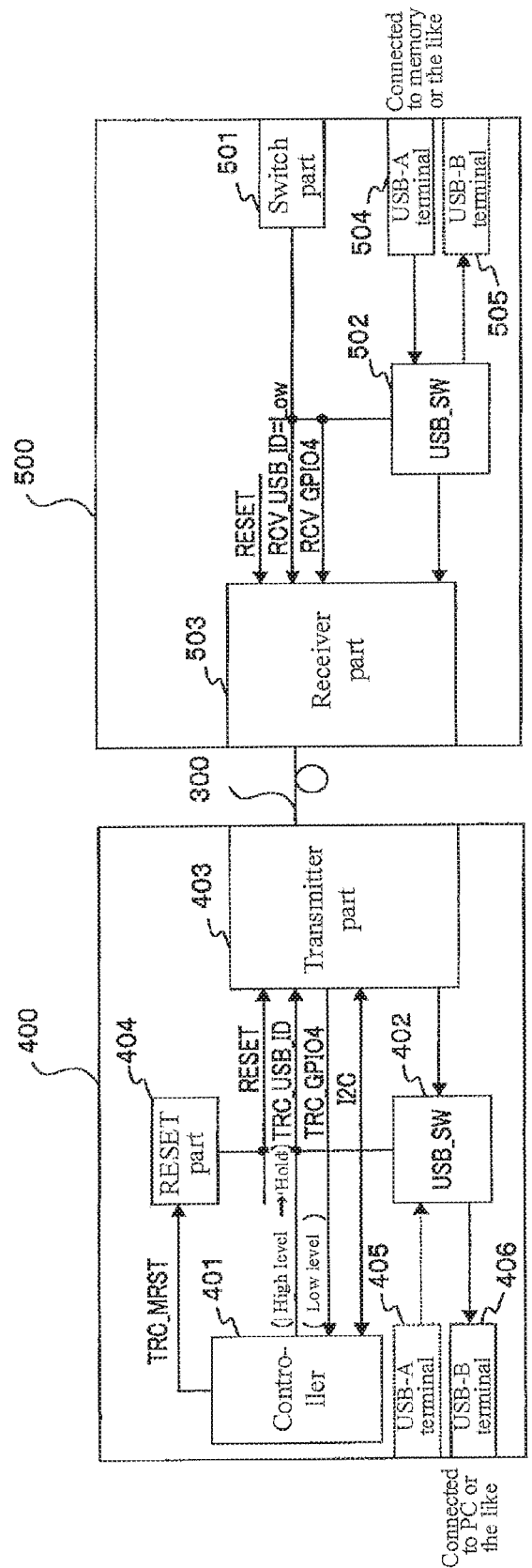

[Fig. 6]
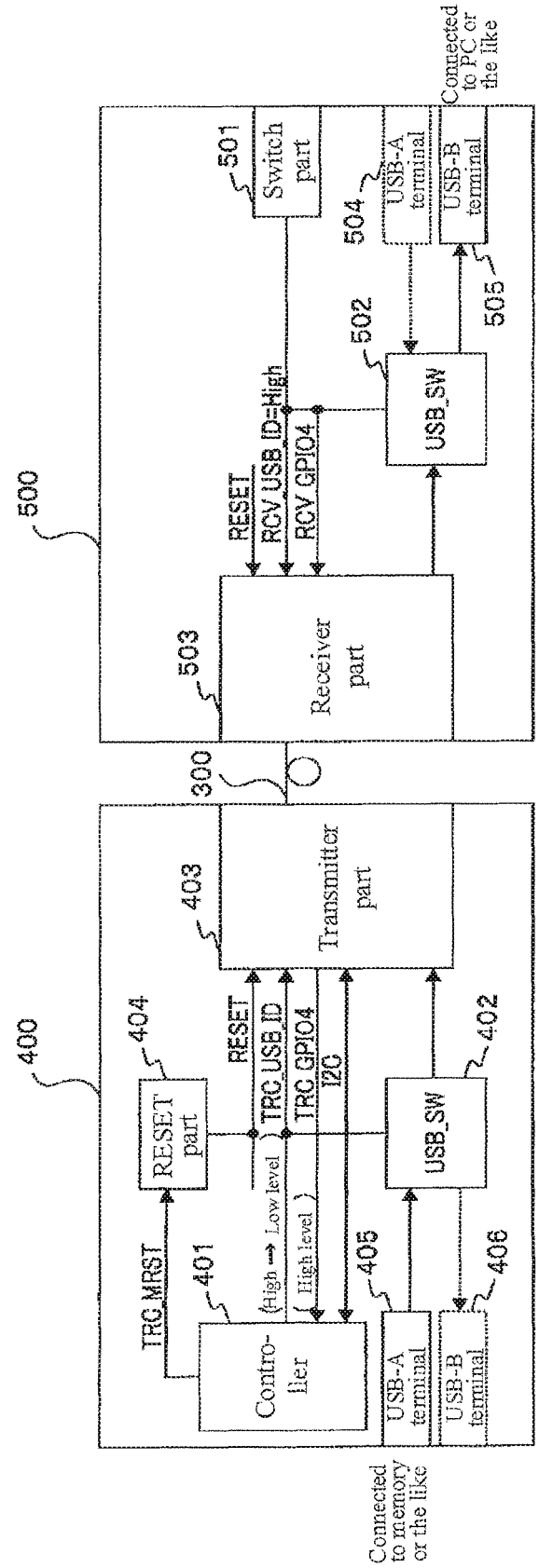

[Fig. 7]
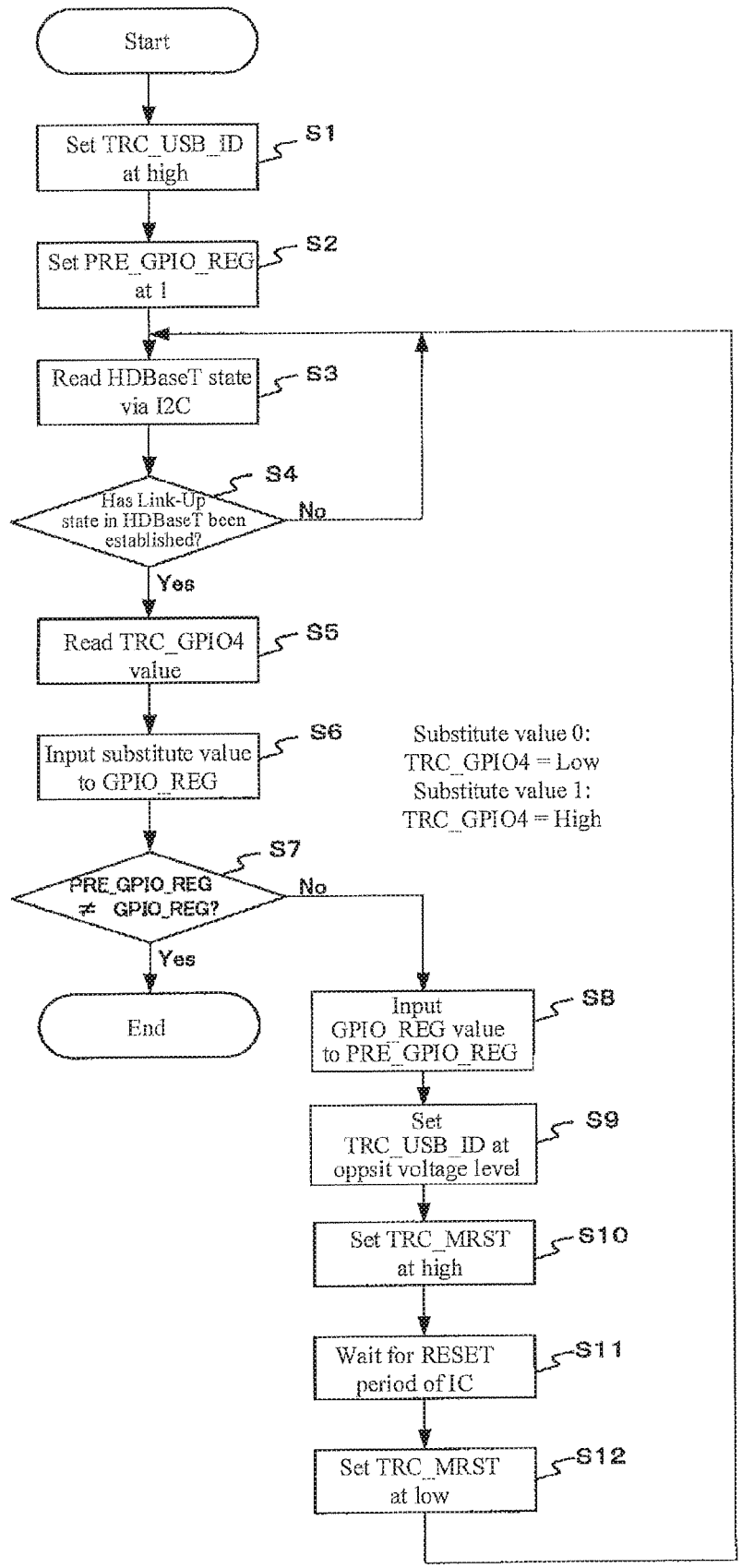

[Fig. 8]
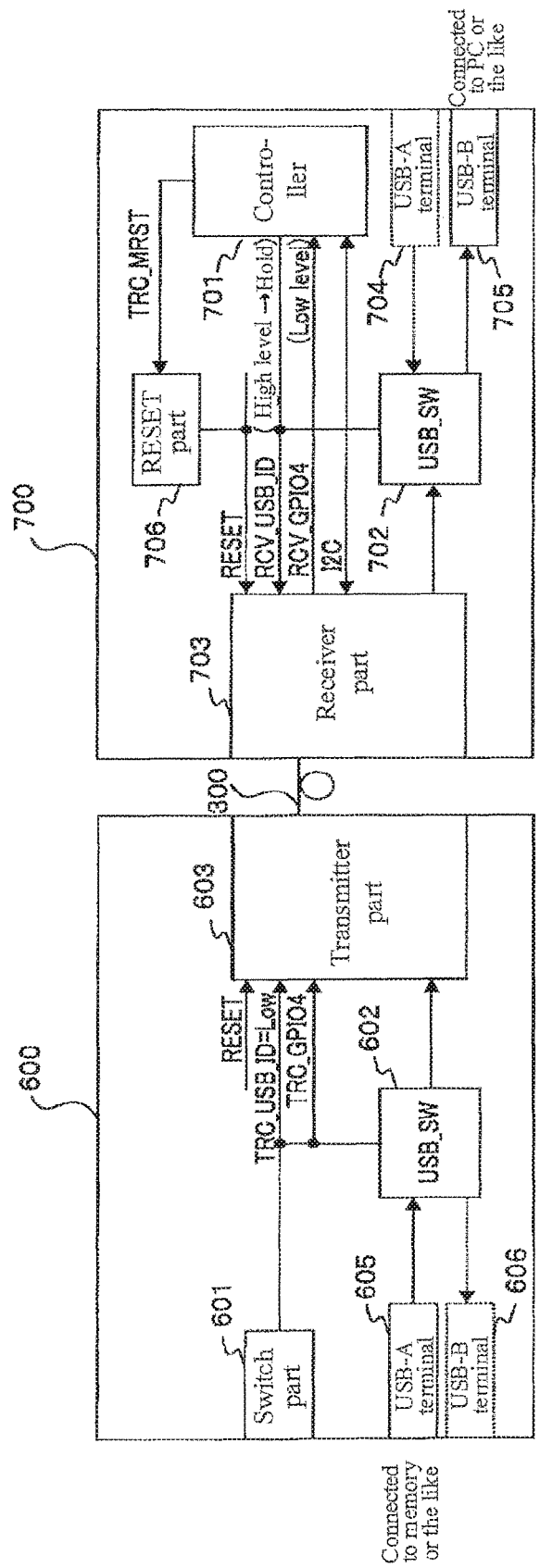

[Fig. 9]
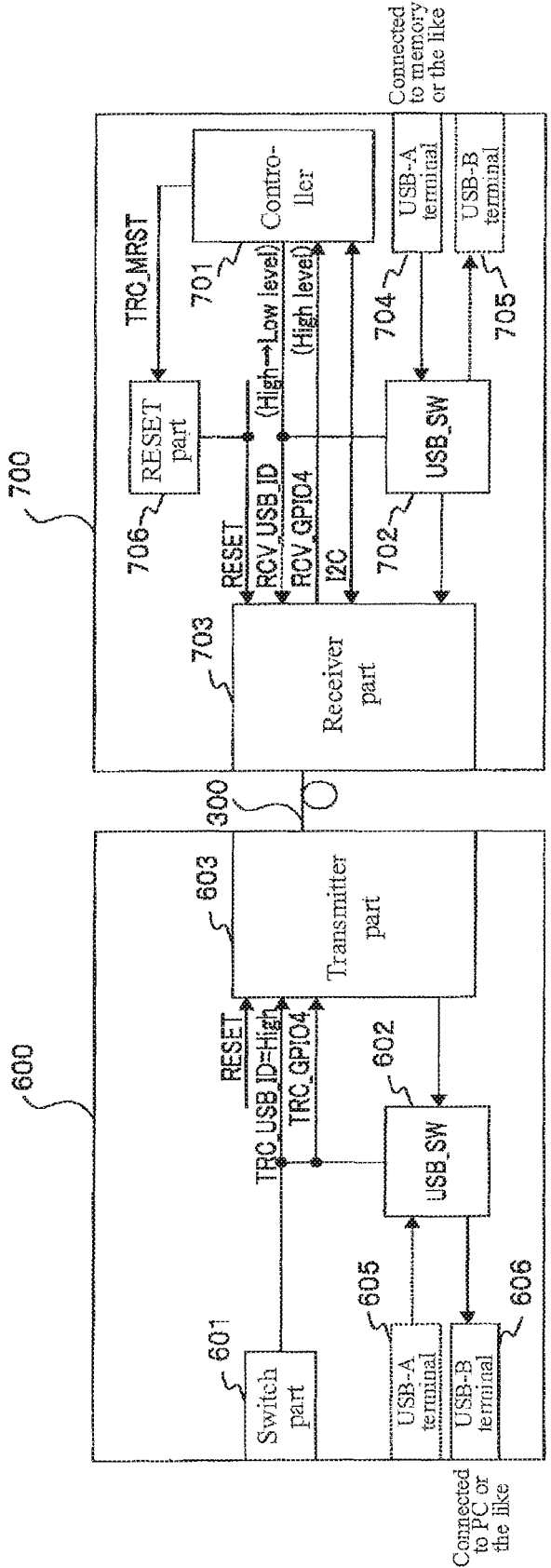

[Fig. 10]
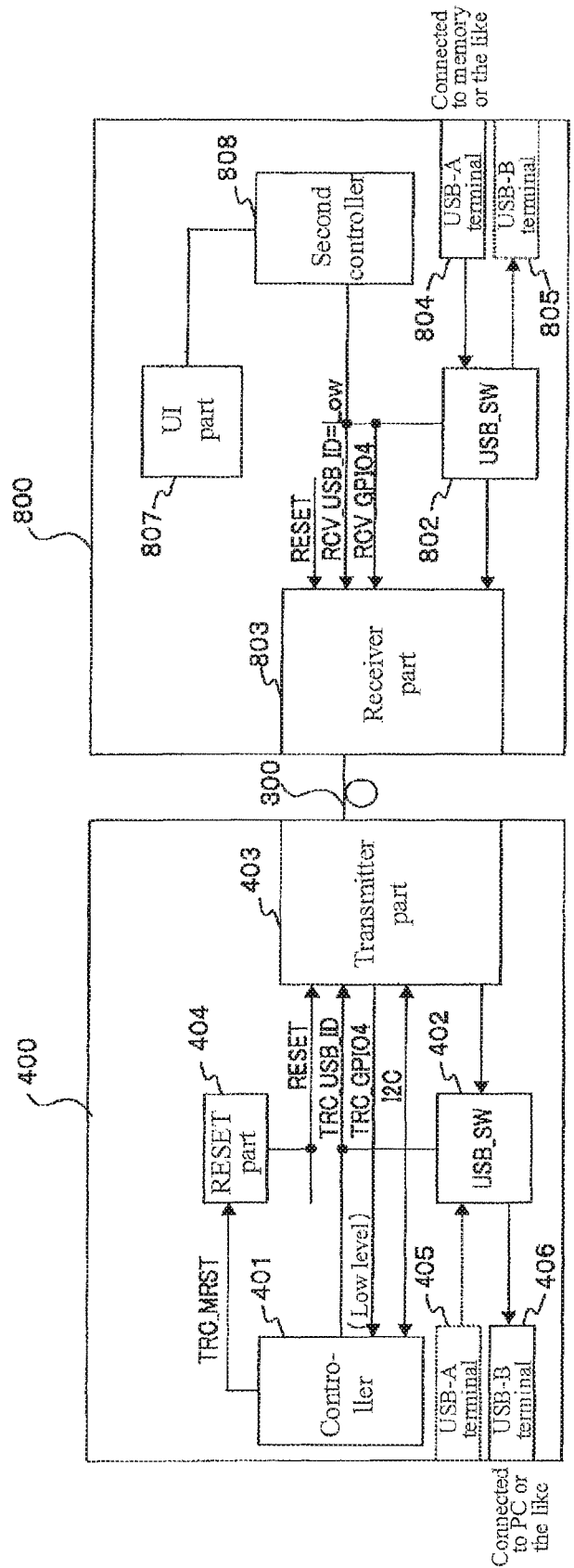

[Fig. 11]
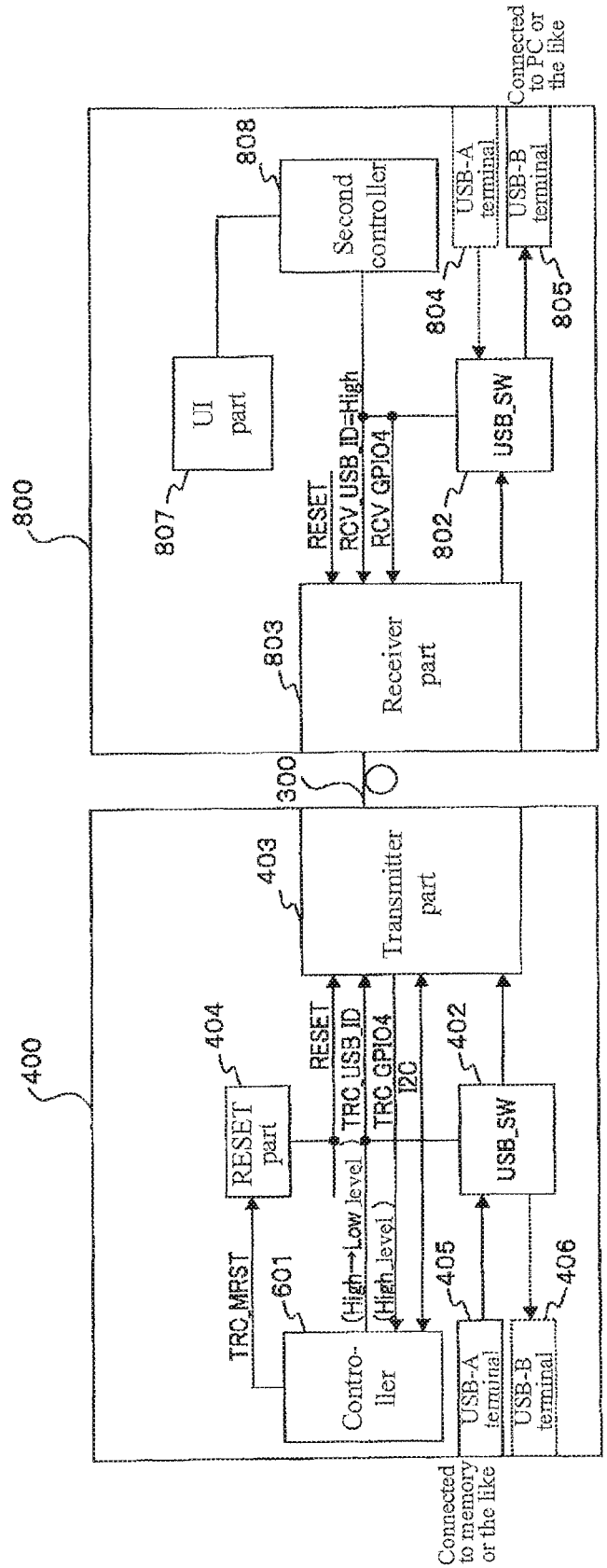

DATA TRANSMISSION SYSTEM, PROJECTOR, AND DATA TRANSMISSION METHOD INCLUDING FIRST APPARATUS WITH FIRST COMMUNICATION PART AND SECOND APPARATUS WITH SECOND COMMUNICATION PART

TECHNICAL FIELD

The present invention relates to a data transmission system, a projector, and a data transmission method.

BACKGROUND ART

Recently, an electronic equipment, that conforms to the transmission standard called HDBaseT (registered trademark), has been developed which enables transmission and reception of video signals and audio signals and supply of electric power between a transmitter apparatus and a receiver apparatus connected to each other by a local area network (LAN) cable (see Patent Literature 1).

In the electronic equipment that conforms to HDBaseT, the receiver apparatus receives the video signals and audio signals transmitted from the transmitter apparatus over the LAN cable and reproduces the received video signals and audio signals.

In a system that uses the HDBaseT transmission, a video signal, an UART, a remote controller signal, a LAN signal, a GPIO operation and the like are input to an integrated circuit (IC) of the transmitter apparatus, and the signals are encoded into a signal format that conforms to HDBaseT in the IC and transmitted. The converted signals are received on an IC in the receiver apparatus and decoded in the IC into the original signals. The ICs in the transmitter apparatus and the receiver apparatus, that conform to the HDBaseT transmission scheme, may further conform to the USB transmission scheme for handling universal serial bus (USB) signals.

An apparatus capable of transmitting USB signals typically has an USB-A terminal to which an USB DEVICE device such as a memory or a mouse is connected and an USB-B terminal to which an USB HOST device such as a personal computer (PC) is connected, and uses one of the USB-A terminal and the USB-B terminal. Whether the USB-A terminal or the USB-B terminal is used depends on the voltage set at a discrimination terminal when the apparatus is activated. The voltage at the discrimination terminal is set by a switch or the like.

In a transmission system that uses USB signals, the USB HOST device operates as a controlling device, and the USB DEVICE device operates as a controlled device. The USB HOST device controls the USB DEVICE device by USB signals. Therefore, the signal processing method performed in a case where the USB HOST device is connected to the apparatus is different from the signal processing method performed in a case where the USB DEVICE device is connected to the apparatus. As a result, it is necessary to switch the control method (operation mode).

In a system that uses the HDBaseT transmission with superimposed USB signals, the transmitter apparatus and the receiver apparatus each determine the USB processing operation depending on the voltage status at the discrimination terminal described above when the power source is turned on, and perform a setting to switch the firmware to operate. For example, if the transmitter apparatus is set for connection to an USB HOST device, and the receiver apparatus is set for connection to an USB DEVICE device, the USB HOST device such as an PC connected to the transmitter apparatus can read data or the like from the USB DEVICE device such as an USB memory connected to the receiver apparatus.

CITATION LIST

Patent Literature

Patent Literature 1: JP2015-126324A

DISCLOSURE OF THE INVENTION

Problem to be Solved by the Invention

In the HDBaseT equipment, the transmitter apparatus and the receiver apparatus operate independently, and therefore, the transmitter apparatus and the receiver apparatus can be set in the same USB operation mode. If the transmitter apparatus and the receiver apparatus are in the same setting in which an USB HOST device is connected thereto or an USB DEVICE device is connected thereto, data cannot be transmitted via the transmitter apparatus and the receiver apparatus between the USB device (first external apparatus) connected to the transmitter apparatus and the USB device (second external apparatus) connected to the receiver apparatus.

The present invention provides a data transmission system and a data transmission method that can perform data transmission according to a second transmission scheme between external apparatuses each of which is connected to a device that performs transmission according to a first transmission scheme.

Means for Solving the Problem

A data transmission system according to the present invention is a data transmission system that transmits data between a first external apparatus and a second external apparatus, the data transmission system comprising:

a first apparatus that is connected to the first external apparatus using a first transmission scheme and a second apparatus that is connected to the second external apparatus using the first transmission scheme, wherein the first apparatus is connected to the second apparatus using a second transmission scheme that is different from the first transmission scheme, and when an operation mode of the first apparatus in the first transmission scheme and an operation mode of the second apparatus in the first transmission scheme are different, data in the first external apparatus or the second external apparatus is transmitted to the second external apparatus or to the first external apparatus via said first apparatus and the second apparatus.

A projector according to the present invention is a projector that incorporates at least one of the first apparatus and the second apparatus of the data transmission system described above.

A data transmission method according to the present invention is a data transmission method for transmitting data between a first external apparatus and a second external apparatus, the data transmission method comprising:

connecting the first external apparatus and a first apparatus to each other using a first transmission scheme;

connecting the second external apparatus and a second apparatus to each other using the first transmission scheme;

connecting the first apparatus and the second apparatus to each other using a second transmission scheme that is different from the first transmission scheme; and transmitting data in the first external apparatus or the second external apparatus to the second external apparatus or to the first external apparatus via the first apparatus and the second apparatus when an operation mode of the first apparatus in the first transmission scheme and an operation mode of the second apparatus in the first transmission scheme are different.

Effect of the Invention

According to the present invention configured as described above, data transmission according to a second transmission scheme can be performed between external apparatuses each of which is connected to a device that performs transmission according to a first transmission scheme.

BRIEF DESCRIPTION OF THE DRAWINGS

FIG. 1 is a diagram showing signals transmitted according to HDBaseT.

FIG. 2 is a diagram showing an example of an HDBaseT system.

FIG. 3 is a block diagram showing a schematic configuration of the HDBaseT system.

FIG. 4A is a block diagram showing a configuration of essential parts of a first example embodiment according to the present invention.

FIG. 4B is a block diagram showing a configuration of essential parts of a first apparatus and a second apparatus shown in FIG. 4A.

FIG. 5 is a block diagram showing a configuration of essential parts of the first example embodiment according to the present invention.

FIG. 6 is a block diagram showing a configuration of essential parts of the first example embodiment according to the present invention.

FIG. 7 is a flowchart showing a control operation performed by controller 401.

FIG. 8 is a block diagram showing a configuration of essential parts according to a second example embodiment.

FIG. 9 is a block diagram showing a configuration of essential parts of a second example embodiment according to the present invention.

FIG. 10 is a block diagram showing a configuration of essential parts of a third example embodiment according to the present invention.

FIG. 11 is a block diagram showing a configuration of essential parts of the third example embodiment according to the present invention.

EXAMPLE EMBODIMENTS

Next, example embodiments will be described with reference to the drawings.

FIG. 1 is a diagram showing signals transmitted according to HDBaseT. A video signal and an audio signal (TMDS), a remote controller signal (IR), an RS-232C signal (URAT), an Ethernet (registered trademark) signal (LAN), and an USB signal are input to transmitter part 1 provided in a transmitter apparatus and converted for transmission on LAN line 3. On the other hand, receiver part 2 provided in a receiver apparatus demodulates the signals converted in transmitter part 1 and transmitted over LAN line 3 to recover the original signals.

In some HDBaseT systems, transmitter part 1 and receiver part 2 have a function of connecting to an USB HOST device and a function of connecting to an USB DEVICE device. In a method of using HDBaseT, transmitter part 1 and receiver part 2 are connected to each other by LAN line 3, and the HDBaseT system can be made to operate as an expansion device (relay device) by extending LAN line 3.

When the HDBaseT transmission scheme is used to transmit an USB signal, if one of the devices is set in an operation mode in which the device operates as an USB DEVICE device to which an USB HOST device is connected, the other device has to operate in an operation mode in which the device operates as an USB HOST device to which an USB DEVICE device is connected. If both the devices are set in the same operation mode, both the devices try to operate as USB HOST devices or as USB DEVICE devices, and USB data transmission is impossible.

FIG. 2 is a diagram showing an example of the HDBaseT system. Transmitter apparatus 4 operates by itself. The receiver apparatus is incorporated in projector 5.

FIG. 3 is a block diagram showing a schematic configuration of the HDBaseT system. This drawing shows a part of the HDBaseT system equipped with an USB that is involved with transmission of an USB signal.

Transmitter part 43 and receiver part 53 have both a function of operating as an USB HOST device and a function of operating as an USB DEVICE device. The operation mode in which transmitter part 43 and receiver part 53 operate depends on the voltage set on a DIP switch, for example, which is provided in switch parts 41 and 51 and can be externally set. Transmitter part 43 and receiver part 53 obtain the voltage information from terminals in transmitter part 43 and receiver part 53, respectively. For example, when a reset (RESET) of receiver part 53 is released, transmitter part 43 and receiver part 53 check the voltages at the respective terminals and determine the respective operation modes by switching firmware to be activated therein.

However, since transmitter part 43 and receiver part 53 determine the respective operation modes based on the voltages set on switch parts 41 and 51 that can be externally set, transmitter part 43 and receiver part 53 can be set in the same operation mode depending on the settings of switch parts 41 and 51. In such a case, data cannot be transmitted via the transmitter apparatus and the receiver apparatus between an USB device (a first external apparatus) connected to the transmitter apparatus via USB switch 42 and an USB device (a second external apparatus) connected to the receiver apparatus via USB switch 52.

First Example Embodiment

FIG. 4A is a block diagram showing a configuration of essential parts of a first example embodiment according to the present invention. FIG. 4B is a block diagram showing a configuration of essential parts of a first apparatus and a second apparatus shown in FIG. 4A.

The system shown in FIG. 4A is a data transmission system that includes first apparatus 101, second apparatus 201, first external apparatus 104 and second external apparatus 204, and in which data is transmitted between first external apparatus 104 and second external apparatus 204.

First apparatus 101 includes first communication part 102 that is connected to first external apparatus 104 according to an USB transmission scheme, which is a first transmission scheme, and setting signal output part 103 that outputs a first setting signal indicating the operation mode of first communication part 102 in the USB transmission scheme to first communication part 102.

Second apparatus 102 includes second communication part 202 connected to second external apparatus 204 according to the USB transmission scheme, and controller 203 that sets the operation mode of second communication part 202 in the USB transmission scheme.

First communication part 102 and second communication part 202 are connected to each other according to HDBaseT, which is a second transmission scheme different from the USB transmission scheme.

Although in the system shown in FIG. 3, the switch part serving as the setting signal output part for setting the operation mode is provided in both transmitter apparatus 4 and receiver apparatus 5, the switch part is provided in one of transmitter apparatus 400 and receiver apparatus 500. In the example shown in FIG. 4B, switch part 501 is provided in receiver apparatus 500.

In this example embodiment, transmitter apparatus 400 includes controller 401, USB switch part (USB_SW) 402, transmitter part 403, reset (RESET) part 404, USB-A terminal 405, and USB-B terminal 406. Transmitter apparatus 400 corresponds to second apparatus 201 in FIG. 4A, controller 401 and reset (RESET) part 404 correspond to controller 203 in FIG. 4A, and USB switch part (USB_SW) 402, transmitter part 403, USB-A terminal 405 and USB-B terminal 406 correspond to second communication part 202 in FIG. 4A.

Receiver apparatus 500 includes switch part 501, USB switch part (USB_SW) 502, receiver part 503, USB-A terminal 504, and USB-B terminal 505. Receiver apparatus 500 corresponds to first apparatus 101 in FIG. 4A, switch part 501 corresponds to setting signal output part 103 in FIG. 4A, and USB switch part (USB_SW) 502, receiver part 503, USB-A terminal 504 and USB-B terminal 505 correspond to first communication part 102 in FIG. 4A.

At least one of transmitter apparatus 400 and receiver apparatus 500 may be incorporated in a projector.

Receiver apparatus 500 is an example of the first apparatus. Transmitter apparatus 400 is an example of the second apparatus. Receiver part 503 is an example of the first communication part. Transmitter part 403 is an example of the second communication part. Switch part 501 is an example of the setting signal output part. A PC or USB memory provided with an USB terminal is an example of the external apparatus. USB is an example of the first transmission scheme. HDBaseT is an example of the second transmission scheme. USB switch parts 402 and 502 are an example of a terminal selector. USB-A terminals 405, 504 and USB-B terminals 406, 505 are examples of terminals associated with respective operation modes of the USB transmission scheme. The USB-A terminal and the USB-B terminal are sometimes referred to simply as an USB terminal.

A high-level or low-level voltage setting signal (first setting signal) set in switch part 501 of receiver apparatus 500 is input to an RCV_USB_ID terminal to set the operation mode of USB of receiver part 503. When a reset (RESET) is released, the setting signal is read in, and receiver part 503 determines whether to make firmware running therein operate as firmware for the USB HOST device or operate as firmware for the USB DEVICE device. The setting signal is also input to an RCV_GPIO4 terminal. A reset (RESET) signal may be a power-on reset signal or a reset output from a dedicated device for generating a reset signal, for example. The reset (RESET) signal can be of any scheme as far as a reset retention period of receiver part 503 is secured. Receiver part 503 is reset when the reset signal is input thereto.

When a link-up state where a signal such as a video, UART or the like can be communicated according to the HDBaseT transmission scheme is established between transmitter part 403 and receiver part 503, transmitter apparatus 400 outputs a signal at the same potential (in the same status) as the setting signal input to the RCV_GPIO4 terminal of the receiver part 503 to a TRC_GPIO4 terminal of transmitter part 403 that corresponds to the RCV_GPIO4 terminal of receiver part 503. The TRC_GPIO4 terminal of transmitter part 403 and the RCV_GPIO4 terminal of receiver apparatus 500 are set as corresponding terminals in advance, and once a link-up state is established, the TRC_GPIO4 terminal of transmitter part 403 is set in the same status (high or low) as the RCV_GPIO4 terminal of receiver apparatus 500. In short, receiver part 503 is set in the operation mode associated with the first setting signal, generates a second setting signal that indicates the operation mode of USB set in receiver part 503, and communicates the second setting signal to transmitter part 403 according to HDBaseT. Transmitter part 403 outputs the received second setting signal to a terminal. Depending on the setting, the RCV_GPIO4 terminal of receiver apparatus 500 can also be set in the same status (high or low) as the TRC_GPIO4 terminal of transmitter part 403. Since the signal output from the TRC_GPIO4 terminal is at the same potential (in the same status) as the RCV_USB_ID terminal set in receiver part 503, controller 401 can grasp the set value (operation mode) of USB set in receiver part 503 by reading the potential (status). Controller 401 is connected to transmitter part 403 via an I2C bus and reads the status of transmitter part 403 to check whether a link-up state has been established. Transmitter part 403 is reset when the reset signal is input.

USB switch part 402 selects an USB terminal to be used according to the operation mode of transmitter part 403. USB switch part 502 selects an USB terminal to be used according to the operation mode of receiver part 503.

When transmitter part 403 or receiver part 503 is in the operation mode to operate as an USB DEVICE device, a device (USB HOST device) having an USB HOST function such as a PC is connected to transmitter part 403 or to receiver part 503 via an USB terminal, for example. The USB HOST device uses the USB-A terminal, and therefore, USB switch parts 402 and 502 select the USB-B terminal. In other words, when transmitter part 403 is in the operation mode to operate as an USB DEVICE device, USB switch part 402 makes the USB-B terminal available. When receiver part 503 is in the operation mode to operate as an USB DEVICE device, USB switch part 502 makes the USB-B terminal available. The operation mode to operate as an USB HOST device and the operation mode to operate as an USB DEVICE device are examples of the operation modes in the USB transmission scheme.

On the other hand, when transmitter part 403 or receiver part 503 is in the operation mode to operate as an USB HOST device, a device (USB DEVICE device) having an USB DEVICE function such as an USB memory is connected to transmitter part 403 or to receiver part 503 via an USB terminal, for example. The USB DEVICE device uses the USB-B terminal, and therefore, USB switch parts 402 and 502 select the USB-A terminal. In other words, when transmitter part 403 is in the operation mode to operate as an USB HOST device, USB switch part 402 makes the USB-A terminal available. When receiver part 503 is in the operation mode to operate as an USB HOST device, USB switch part 502 makes the USB-A terminal available.

Reset part 404 generates a reset signal in response to a high signal input externally, and can thereby trigger a reset. For example, reset part 404 has a circuit configuration in which a collector of a transistor is connected to a reset (RESET) signal line, a TRC_MRST signal output from controller 401 is connected to a base of the transistor, and a high signal is output to set the reset signal line at a low level to retain a reset state for a prescribed time.

FIGS. 5 and 6 are block diagrams for illustrating transmission of USB signals when switch part 501 of receiver apparatus 500 is set at a high level and a low level, respectively.

As shown in FIG. 5, when switch part 501 of receiver apparatus 500 is set at the low level, and the RCV_USB_ID terminal of receiver part 503 is at the low level, receiver part 503 activates the firmware to operate as a device having an USB HOST function. The output of switch part 501 is input to USB switch part 502. USB switch part 502 makes USB-A terminal 504 available so that a device having an USB DEVICE function can be connected to receiver part 503. The output of switch part 501 is input to the RCV_GPIO4 terminal of receiver part 503.

On the other hand, when controller 401 of transmitter apparatus 400 is activated, controller 401 outputs a high level signal to a TRC_USB_ID terminal of transmitter part 403 as an initial setting of the output for setting the USB operation mode. If the TRC_USB_ID terminal is set at the high level, transmitter part 403 activates the firmware to operate as a device having an USB DEVICE function. After that, when the link-up state is established between transmitter part 403 and receiver part 503, a low level signal is output from the TRC_GPIO4 terminal of transmitter part 403. Based on the fact that the signal from the TRC_GPIO4 terminal is at the low level, which is different from the high level of the signal output to the TRC_USB_ID terminal when controller 401 is activated, and the apparatuses are in different operation modes, that is, based on the fact that USB signals can be transmitted between the apparatuses, controller 401 maintains the control signal to the TRC_USB_ID terminal at the high level and does not provide any output from a TRC_MRST terminal. As a result, transmitter part 403 of transmitter apparatus 400 operates as a device having an USB DEVICE function. The output for setting the USB operation mode from controller 401 is input to USB switch part 402. USB switch part 402 makes USB-B terminal 406 available so that a device having an USB HOST function can be connected to transmitter part 403.

As shown in FIG. 6, when switch part 501 of receiver apparatus 500 is set at the high level, and the RCV_USB_ID terminal of receiver part 503 is at the high level, receiver part 503 activates the firmware to operate as a device having an USB DEVICE function. The output of switch part 501 is input to USB switch part 502. USB switch part 502 makes USB-B terminal 505 available so that a device having an USB HOST function can be connected to receiver part 503. A PC or the like is connected to USB-B terminal 505. The output of switch part 501 is input to the RCV_GPIO4 terminal of receiver part 503.

On the other hand, when controller 401 of transmitter apparatus 400 is activated, controller 401 outputs a high level signal to the TRC_USB_ID terminal of transmitter part 403 as an initial setting of the output for setting the USB operation mode. If the TRC_USB_ID terminal is set at the high level, transmitter part 403 activates the firmware to operate as a device having an USB DEVICE function. After that, when the link-up state is established between transmitter part 403 and receiver part 503, a high level signal is output from the TRC_GPIO4 terminal of transmitter part 403. Based on the fact that the signal from the TRC_GPIO4 terminal is at the high level, which is the same as the signal output to the TRC_USB_ID terminal when controller 401 is activated, and the apparatuses are in the same operation mode, that is, based on the fact that USB signals cannot be transmitted between the apparatuses, controller 401 changes the level of the control signal to the TRC_USB_ID terminal to the low level and outputs a high level signal from the TRC_MRST terminal for a RESET period. As a result, transmitter part 403 is reset, and transmitter part 403 and receiver part 503 temporarily enter a link-down state in which a video, UART or other signal cannot be communicated between the parts according to the HDBaseT transmission scheme. After transmitter part 403 is reset, if the TRC_USB_ID terminal is at the low level, transmitter part 403 activates the firmware to operate as a device having an USB HOST function. After that, when the link-up state is established between transmitter part 403 and receiver part 503, the high level signal is output from the TRC_GPIO4 terminal of transmitter part 403. Based on the fact that the signal from the TRC_GPIO4 terminal is at the high level, which is different from the low level of the signal output to the TRC_USB_ID terminal at the time of the reset, and the apparatuses are in different operation modes, that is, based on the fact that USB signals can be transmitted between the apparatuses, controller 401 maintains the control signal to the TRC_USB_ID terminal at the low level and does not provide any output from the TRC_MRST terminal. As a result, transmitter part 403 of transmitter apparatus 400 operates as a device having an USB HOST function. The output for setting the USB operation mode from controller 401 is input to USB switch part 402. USB switch part 402 makes USB-A terminal 405 available so that a device having an USB DEVICE can be connected to transmitter part 403.

FIG. 7 is a flowchart showing a control operation performed by controller 401.

Controller 401 sets the TRC_USB_ID terminal at the high level as the initial setting of the USB operation mode (Step S1). As a result, transmitter apparatus 400 (transmitter part 403) is to be once activated in a state where an USB HOST device is to be connected thereto. A register PRE_GPIO_REG for holding the previous TRC_USB_ID value provided in controller 401 is then set at 1 (Step S2).

Controller 401 then reads the state of transmitter part 403 via the I2C bus (Step S3) and checks whether the link-up state has been established (Step S4).

As specific operations in Steps S3 and S4, controller 401 can check whether the link-up state has been established by issuing a command over the I2C bus and reading the state of transmitter part 403 to check whether transmitter part 403 is operating according to HDBaseT. If the link-up state has not been established (if No in S4), controller 401 periodically issues a read command again and continues reading until the link-up state is established. As an alternative to the continuous reading, reading may be performed for a little while, such as 1 second, after confirming whether the up-link state has been established.

If it is determined in Step S4 that the link-up state has been established (if Yes in S4), the voltage input to the RCV_GPIO4 terminal of the receiver part 503 is output to the TRC_GPIO4 terminal of transmitter part 404, and controller 401 reads the voltage value (setting status) (Step S5). Controller 401 reads this value because, as shown in FIG.

4B, the TRC_GPIO4 terminal is connected to a GPIO terminal of controller 401 in the circuit. If the read value is at the low level, controller 401 inputs a substitute value 0 to a register GPIO_REG that indicates the current TRC_G-PIO4 value. If the read value is at the high level, controller 401 inputs a substitute value 1 to the register GPIO_REG (Step S6).

Controller 401 then compares the value of the register PRE_GPIO_REG that indicates the previous TRC_USB_ID value and the current TRC_GPIO4 value (Step S7). If the comparison shows that the values of the registers differ (if Yes in S7), this means that transmitter apparatus 400 (transmitter part 403) and receiver apparatus 500 (receiver part 503) are operating in different states (different operation modes), that is, USB signals can be transmitted between the apparatuses, so that controller 401 completes the USB setting process. In this case, transmitter apparatus 400 (transmitter part 403) operates as an USB DEVICE device, and receiver apparatus 500 (receiver part 503) operates as an USB HOST device, and the apparatuses operate in the connection state shown in FIG. 5.

If the comparison in Step S7 shows that the values of the registers PRE_GPIO_REG and GPIO_REG are the same (if No in S7), this means that transmitter apparatus 400 (transmitter part 403) and receiver apparatus 500 (receiver part 503) are operating in the same state (same operation mode), that is, USB signals cannot be transmitted between the apparatuses, so that controller 401 proceeds to an operation of changing the TRC_USB_ID value of transmitter apparatus 400.

First, controller 401 inputs the current TRC_GPIO4 value to the register PRE_GPIO_REG as the previous setting value (Step S8). After that, controller 401 sets the TRC_USB_ID value at the level opposite to that in the previous setting, that is, at the low level if the previous setting is the high level, or the high level if the previous setting is the low level (Step S9).

According to this example embodiment, the TRC_USB_ID value reset in Step S8 is detected only when transmitter part 403 is activated. For this reason, transmitter part 403 needs to be reset and activated again. Therefore, controller 401 first sets the TRC_MRST terminal at the high level (Step S10), and sets a reset terminal of transmitter part 403 at the low level. Controller 401 then waits for the reset retention period required to reset transmitter part 403 or longer (Step S11) and sets the TRC_MRST terminal at the low level again (Step S12), thereby releasing the reset state of transmitter part 403. Once transmitter part 403 is reset, transmitter apparatus 400 and receiver apparatus 500 enters the link-down state. Therefore, to check whether the link-up state is established, the process returns to Step S3, and the operation described above is repeated.

By the control described above, transmitter apparatus 400 (transmitter part 403) and receiver apparatus 500 (receiver part 503) can be set in the state where the apparatuses perform different USB functions.

For example, when receiver apparatus 500 (receiver part 503) is set in the operation mode to operate as an USB DEVICE device and is connected to a PC serving as an USB HOST device via their USB terminals, and transmitter apparatus 400 (transmitter part 403) is set in the operation mode to operate as an USB HOST device and is connected to an USB memory serving as an USB DEVICE device via their USB terminals, data can be transmitted between the PC and the USB memory as described below.

The PC and receiver apparatus 500 function as a USB HOST device and an USB DEVICE device, respectively, and are connected to each other by USB, so that data can be transmitted between the PC and receiver apparatus 500. Receiver apparatus 500 and transmitter apparatus 400 are connected by HDBaseT, so that data can be transmitted between receiver apparatus 500 and transmitter apparatus 400. Furthermore, transmitter apparatus 400 and the USB memory function as an USB HOST device and an USB DEVICE device, respectively, and are connected to each other by USB, so that data can be transmitted between transmitter apparatus 400 and the USB memory. That is, data can be transmitted between the PC and the USB memory.

Even if transmitter apparatus 400 functions as an USB DEVICE device as with receiver apparatus 500, if transmitter apparatus 400 is connected to an USB HOST device, data can transmitted between transmitter apparatus 400 and the USB HOST device. However, in this case, data cannot be transmitted between the PC serving as an USB HOST device and the USB HOST device connected to transmitter apparatus 400.

Second Example Embodiment

FIGS. 8 and 9 are block diagrams showing a configuration of essential parts of a second example embodiment according to the present invention.

Although the switch for setting the operation mode is provided in the receiver apparatus in the first example embodiment, the switch for setting the operation mode is provided in the transmitter apparatus in this example embodiment.

In this example embodiment, transmitter apparatus 600 includes switch part 601, USB switch part (USB_SW) 602, transmitter part 603, USB-A terminal 605, and USB-B terminal 606. Receiver apparatus 700 connected to transmitter apparatus 600 by LAN line 300 includes controller 701, USB switch part (USB_SW) 702, receiver part 703, reset (RESET) part 706, USB-A terminal 704 and USB-B terminal 705.

Switch part 601 provided in transmitter apparatus 600 operates in the same way as switch part 501 provided in receiver apparatus 500 in the first example embodiment, and controller 701 and reset part 706 provided in receiver apparatus 700 also operate in the same way as controller 401 and reset part 404 provided in transmitter apparatus 400 in the first example embodiment.

In the state shown in FIG. 8, switch part 601 is set at the low level, and transmitter apparatus 600 (transmitter part 603) operates as an USB HOST device, and receiver apparatus 700 (receiver part 703) operates as an USB DEVICE device.

In the state shown in FIG. 9, switch part 601 is set at the high level, and transmitter apparatus 600 (transmitter part 603) operates as an USB DEVICE device, and receiver apparatus 700 (receiver part 703) operates as an USB HOST device.

Third Example Embodiment

FIGS. 10 and 11 are block diagrams showing a configuration of essential parts of a third example embodiment according to the present invention.

Although the switch part is provided to switching the setting of the operation mode in the first and second example embodiments, user interface (UI) part 807 and second controller 808 are provided instead of the switch part in this example embodiment. Second controller 808 is an example of the setting signal output part.

In this example embodiment, transmitter apparatus 400 described with regard to the first example embodiment and receiver apparatus 800 are connected to each other by LAN line 300.

Receiver apparatus 800 includes USB switch part (USB_SW) 802, receiver part 803, USB-A terminal 804, USB-B terminal 805, user interface part 807, and second controller 808.

USB switch part 802 and receiver part 803 operate in the same way as USB switch part 502 and receiver part 503 in the first example embodiment.

User interface part 807 includes an input part such as an on-screen display. Second controller 808 reads an input value to the input part and sets the RCV_USB_ID value that sets the USB operation mode of receiver part 803.

In the state shown in FIG. 10, user interface part 807 and second controller 808 set the RCV_USB_ID terminal at the low level, and transmitter apparatus 400 (transmitter part 403) operates as an USB DEVICE device, and receiver apparatus 800 (receiver part 803) operates as an USB HOST device.

In the state shown in FIG. 11, user interface part 807 and second controller 808 set the RCV_USB_ID terminal at the high level, and transmitter apparatus 400 (transmitter part 403) operates as an USB HOST device, and receiver apparatus 800 (receiver part 803) operates as an USB DEVICE device.

In this example embodiment, as in the second example embodiment, the user interface part and the second controller for switching the setting of the operation mode may be provided in the transmitter apparatus, and the controller and the reset part may be provided in the receiver apparatus.

In the first, second and third example embodiments, the first setting signal output from the setting signal output part is transmitted to the controller as the second setting signal via the GPIO terminal of the transmitter part and the GPIO terminal of the receiver part. Although the first setting signal and the second setting signal have been described as the same signal in these example embodiments, the present invention is not limited to this implementation. For example, when the first apparatus includes the first communication part and the setting signal output part that outputs the first setting signal that sets the USB operation mode of the first communication part, and the second apparatus includes the second communication part and the controller that sets the USB operation mode of the second communication part, the second setting signal may be a signal that indicates the USB operation mode set in the first communication part as in the first, second and third example embodiments. Alternatively, the second setting signal may be a signal that indicates the USB operation mode set in the second communication part. The controller sets the USB operation mode to be set in the second communication part according to the contents indicated by the second setting signal.

Although the first, second and third example embodiment have been described as using the USB-A terminal and the USB-B terminal that have different shapes according to the operation mode, the terminals may have the same shape regardless of the operation mode. In that case, the transmitter apparatus and the receiver apparatus may each have one terminal, and the terminal selector such as USB_SWs 402 and 502 for selecting from among terminals may be omitted.

Since the USB operation of one of the apparatuses is specified by the user, the problem in which the apparatuses are set individually to operate in the same mode can be avoided, and stable operation of the apparatuses can be achieved.

The configurations illustrated in the example embodiments described above are just examples, and the present invention is not limited to the configurations.

A part or the whole of the example embodiments described above can be described as follows, although the present invention is not limited to the following configuration.

(SUPPLEMENTARY NOTE 1) A data transmission system that transmits data between a first external apparatus and a second external apparatus, the data transmission system comprising:

a first apparatus that is connected to the first external apparatus using a first transmission scheme and a second apparatus that is connected to the second external apparatus using the first transmission scheme, wherein said first apparatus is connected to said second apparatus using a second transmission scheme that is different from the first transmission scheme, and when an operation mode of said first apparatus in the first transmission scheme and an operation mode of said second apparatus in the first transmission scheme are different, data in the first external apparatus or the second external apparatus is transmitted to the second external apparatus or the first external apparatus, respectively, via said first apparatus and said second apparatus.

(SUPPLEMENTARY NOTE 2) The data transmission system according to Supplementary Note 1, wherein the data in the first external apparatus or the second external apparatus is transmitted between said first apparatus and said second apparatus according to the second transmission scheme.

(SUPPLEMENTARY NOTE 3) The data transmission system according to Supplementary Note 1 or 2, wherein said first apparatus includes a first communication part that connects to the first external apparatus and/or said second apparatus, and a setting signal output part that outputs a first setting signal, that indicates the operation mode of the first communication part in the first transmission scheme, to the first communication part, said second apparatus includes a second communication part that connects to the second external apparatus and/or said first apparatus, and a controller that sets the operation mode of the second communication part in the first transmission scheme, the first communication part generates a second setting signal that corresponds to the operation mode set in the second communication part and transmits the second setting signal to the second communication part, and the controller sets the operation mode of the second communication part according to the second setting signal received via the second communication part.

(SUPPLEMENTARY NOTE 4) The data transmission system according to any one of Supplementary Notes 1 to 3, wherein the operation modes are a first operation mode or a second operation mode.

(SUPPLEMENTARY NOTE 5) The data transmission system according to Supplementary Note 4, wherein said first apparatus further includes:

a first terminal that is associated with the first operation mode and a second terminal that is associated with the second operation mode; and a first terminal selector that makes available a terminal from among the first terminal and the second terminal that is associated with the operation mode set in the first communication part, and said second apparatus further includes:
a third terminal that is associated with the first operation mode and a fourth terminal that is associated with the second operation mode; and
a second terminal selector that makes available a terminal from among the third terminal and the fourth terminal that is associated with the operation mode set in the second communication part.

(SUPPLEMENTARY NOTE 6) The data transmission system according to Supplementary Note 4 or 5, wherein the first operation mode is a mode to operate as an USB HOST device, and
the second operation mode is a mode to operate as an USB DEVICE device.

(SUPPLEMENTARY NOTE 7) The data transmission system according to any one of Supplementary Notes 1 to 6, wherein said first apparatus and said second apparatus are connected to each other by an LAN cable.

(SUPPLEMENTARY NOTE 8) The data transmission system according to any one of Supplementary Notes 3 to 7, wherein the second transmission scheme is HDBaseT, one of the first communication part and the second communication part serves as a transmitter part, and the other serves as a receiver part.

(SUPPLEMENTARY NOTE 9) The data transmission system according to Supplementary Note 8, wherein the first setting signal and the second setting signal are the same signal,
the second communication part is the receiver part, and
the controller receives the second setting signal via a GPIO terminal of the receiver part and sets the second communication part in an operation mode in the first transmission scheme that is different from the operation mode indicated by the second setting signal.

(SUPPLEMENTARY NOTE 10) A projector that incorporates at least one of the first apparatus and the second apparatus of the data transmission system according to any one of Supplementary Notes 1 to 9.

(SUPPLEMENTARY NOTE 11) A data transmission method for transmitting data between a first external apparatus and a second external apparatus, the data transmission method comprising:
connecting the first external apparatus and a first apparatus to each other using a first transmission scheme;
connecting the second external apparatus and a second apparatus to each other using the first transmission scheme;
connecting the first apparatus and the second apparatus to each other using a second transmission scheme that is different from the first transmission scheme; and
transmitting data in the first external apparatus or the second external apparatus to the second external apparatus or the first external apparatus, respectively, via the first apparatus and the second apparatus when an operation mode of the first apparatus in the first transmission scheme and an operation mode of the second apparatus in the first transmission scheme are different.

EXPLANATION OF REFERENCE NUMBERS

400 transmitter apparatus
401 controller
402, 502 USB switch part
403 transmitter part
404 reset part
405, 504 USB-A terminal
406, 505 USB-B terminal
500 receiver apparatus
501 switch part
503 receiver part

The invention claimed is:

1. A data transmission system that transmits data between a first external apparatus and a second external apparatus, the data transmission system comprising:
a first apparatus that is connected to the first external apparatus using a first transmission scheme and a second apparatus that is connected to the second external apparatus using the first transmission scheme,
wherein said first apparatus is connected to said second apparatus using a second transmission scheme that is different from the first transmission scheme, and
when an operation mode of said first apparatus in the first transmission scheme and an operation mode of said second apparatus in the first transmission scheme are different, data in the first external apparatus or the second external apparatus is transmitted to the second external apparatus or the first external apparatus, respectively, via said first apparatus and said second apparatus;
wherein said first apparatus includes a first communication part that connects to the first external apparatus and/or said second apparatus, and a setting signal output part that outputs a first setting signal, that indicates the operation mode of the first communication part in the first transmission scheme, to the first communication part,
said second apparatus includes a second communication part that connects to the second external apparatus and/or said first apparatus, and a controller that sets the operation mode of the second communication part in the first transmission scheme,
the first communication part generates a second setting signal that corresponds to the operation mode set in the second communication part and transmits the second setting signal to the second communication part, and
the controller sets the operation mode of the second communication part according to the second setting signal received via the second communication part.

2. The data transmission system according to claim 1, wherein the data in the first external apparatus or the second external apparatus is transmitted between said first apparatus and said second apparatus according to the second transmission scheme.

3. The data transmission system according to claim 1, wherein the operation modes comprise a first operation mode and a second operation mode.

4. The data transmission system according to claim 3, wherein said first apparatus further includes:
a first terminal that is associated with the first operation mode and a second terminal that is associated with the second operation mode; and
a first terminal selector that makes available a terminal from among the first terminal and the second terminal that is associated with the operation mode set in the first communication part, and
said second apparatus further includes:
a third terminal that is associated with the first operation mode and a fourth terminal that is associated with the second operation mode; and
a second terminal selector that makes available a terminal from among the third terminal and the fourth terminal that is associated with the operation mode set in the second communication part.

5. The data transmission system according to claim 3, wherein the first operation mode comprises a mode to operate as an USB HOST device, and the second operation mode comprises a mode to operate as an USB DEVICE device.

6. The data transmission system according to claim 1, wherein said first apparatus and said second apparatus are connected to each other by an LAN cable.

7. The data transmission system according to claim 1, wherein the second transmission scheme comprises HDBaseT, one of the first communication part and the second communication part serves as a transmitter part, and the other serves as a receiver part.

8. The data transmission system according to claim 7, wherein the first setting signal and the second setting signal comprise the same signal, the second communication part comprises the receiver part, and the controller receives the second setting signal via a GPIO terminal of the receiver part and sets the second communication part in an operation mode in the first transmission scheme that is different from the operation mode indicated by the second setting signal.

9. An electronic equipment that incorporates at least one of the first apparatus and the second apparatus of the data transmission system according to claim 1.

10. The electronic equipment according to claim 9, wherein said electronic equipment comprises a projector.

11. A data transmission method for transmitting data between a first external apparatus and a second external apparatus, the data transmission method comprising:

connecting the first external apparatus and a first apparatus to each other using a first transmission scheme;

connecting the second external apparatus and a second apparatus to each other using the first transmission scheme;

connecting the first apparatus and the second apparatus to each other using a second transmission scheme that is different from the first transmission scheme; and transmitting data in the first external apparatus or the second external apparatus to the second external apparatus or the first external apparatus, respectively, via the first apparatus and the second apparatus when an operation mode of the first apparatus in the first transmission scheme and an operation mode of the second apparatus in the first transmission scheme are different, wherein said first apparatus includes a first communication part that connects to the first external apparatus and/or said second apparatus, and a setting signal output part that outputs a first setting signal, that indicates the operation mode of the first communication part in the first transmission scheme, to the first communication part, said second apparatus includes a second communication part that connects to the second external apparatus and/or said first apparatus, and a controller that sets the operation mode of the second communication part in the first transmission scheme, the first communication part generates a second setting signal that corresponds to the operation mode set in the second communication part and transmits the second setting signal to the second communication part, and the controller sets the operation mode of the second communication part according to the second setting signal received via the second communication part.

* * * * *